June 2, 1936. E. S. STEPHENS 2,043,127
TESTING DEVICE FOR LIQUIDS
Filed April 7, 1931 6 Sheets—Sheet 1

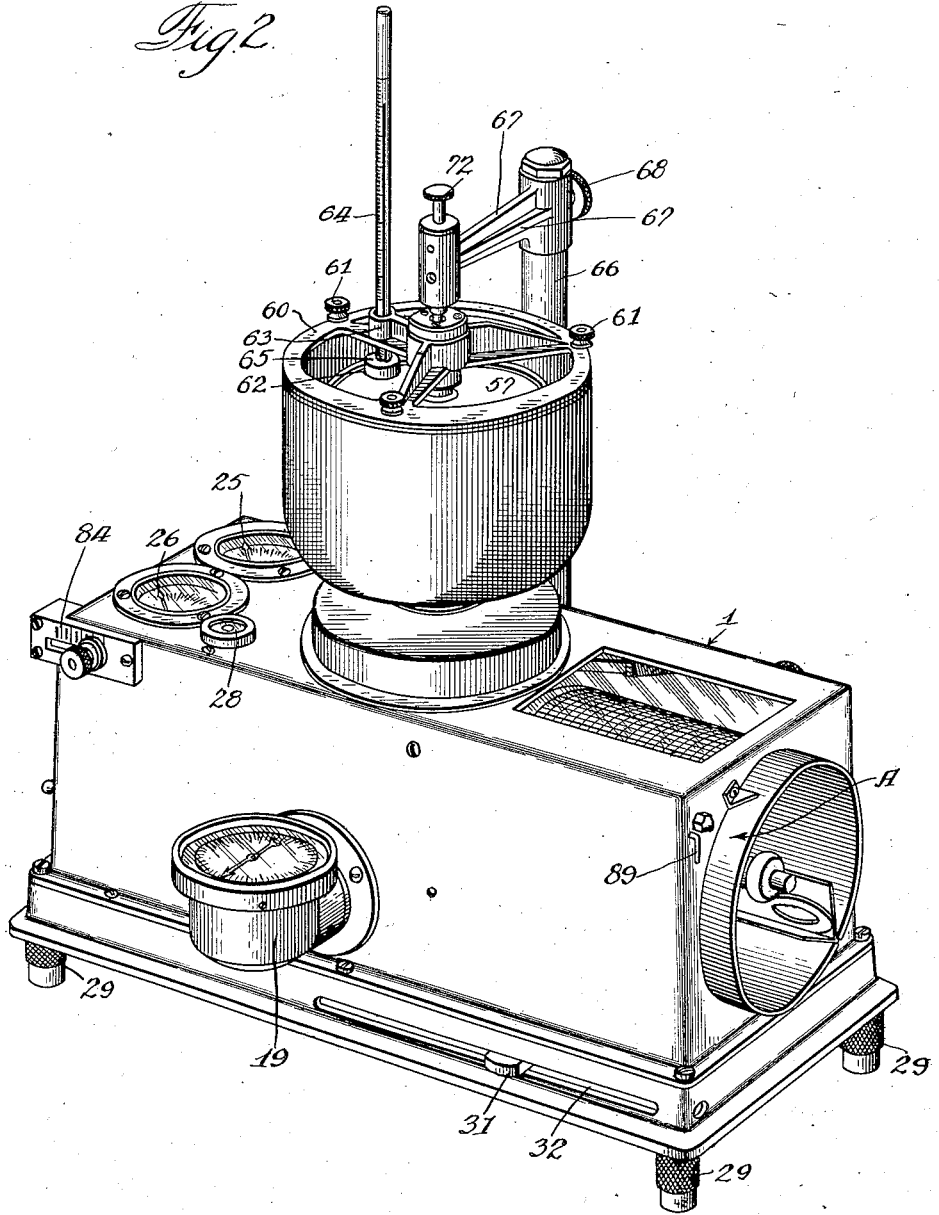

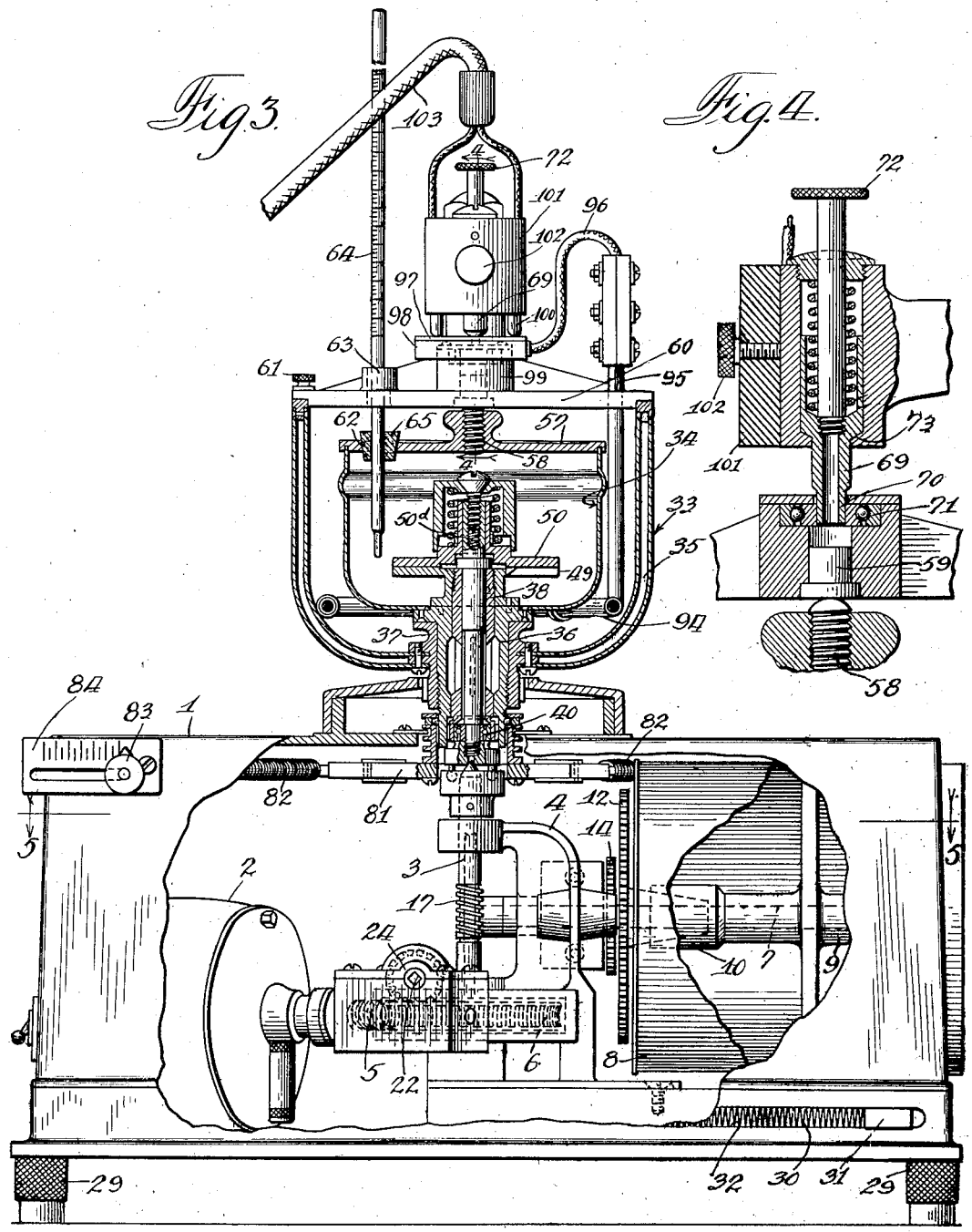

June 2, 1936.　　E. S. STEPHENS　　2,043,127
TESTING DEVICE FOR LIQUIDS
Filed April 7, 1931　　6 Sheets-Sheet 4
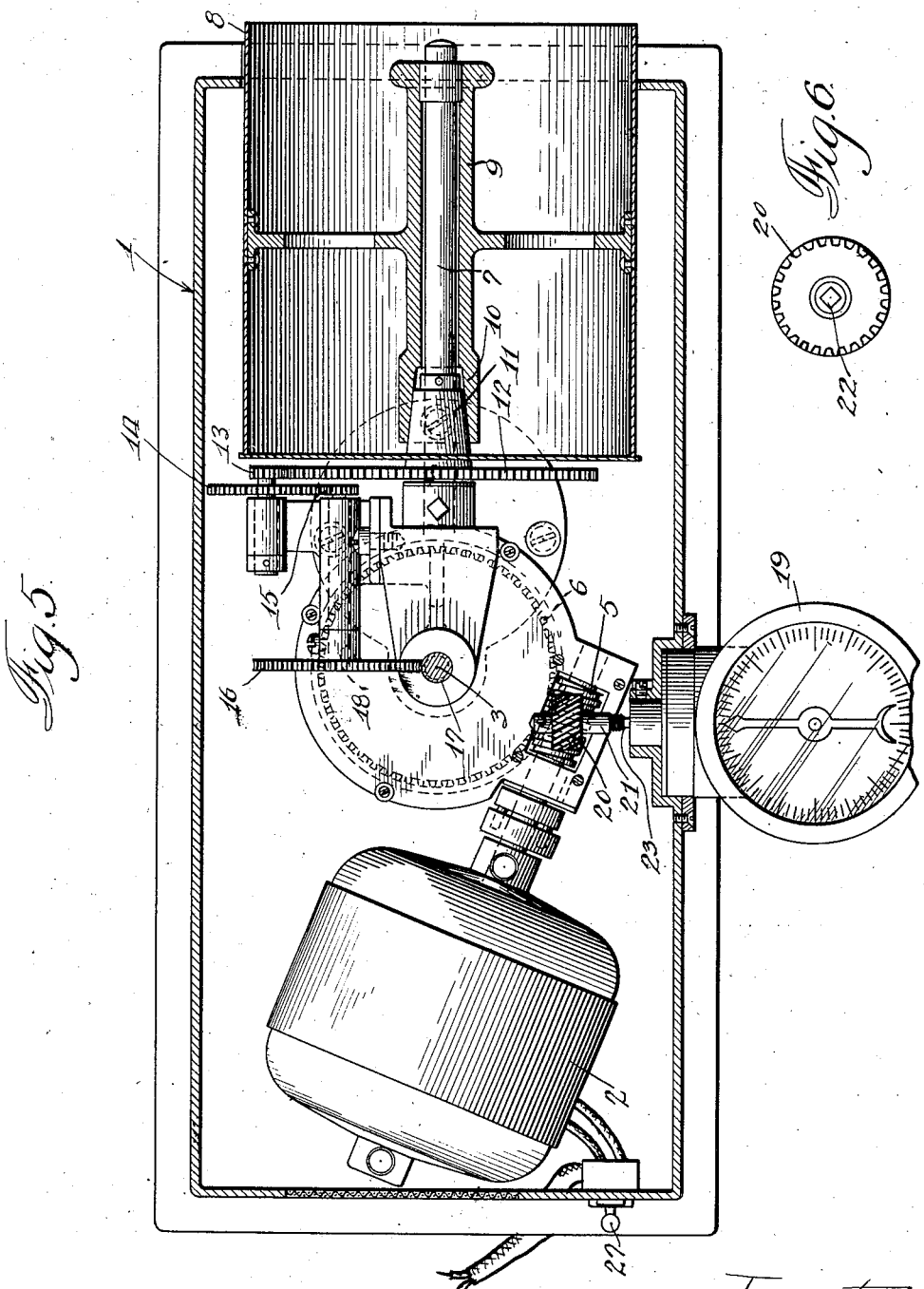
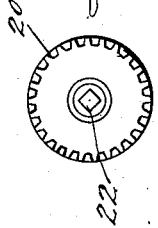
Inventor
Elton S. Stephens.
By Jones, Addington, Ames & Seibold
Attys.

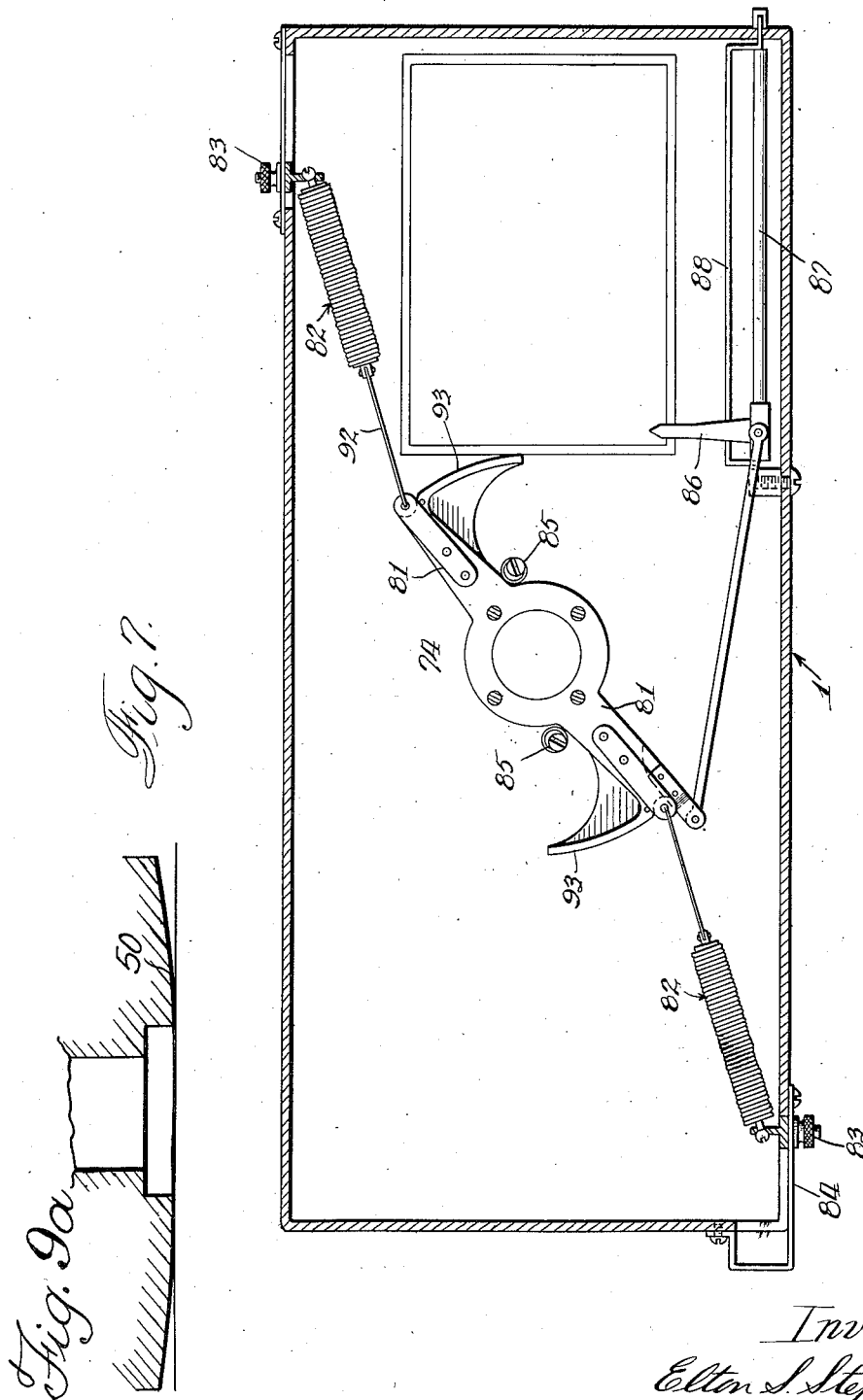

June 2, 1936.  E. S. STEPHENS  2,043,127
TESTING DEVICE FOR LIQUIDS
Filed April 7, 1931  6 Sheets-Sheet 6
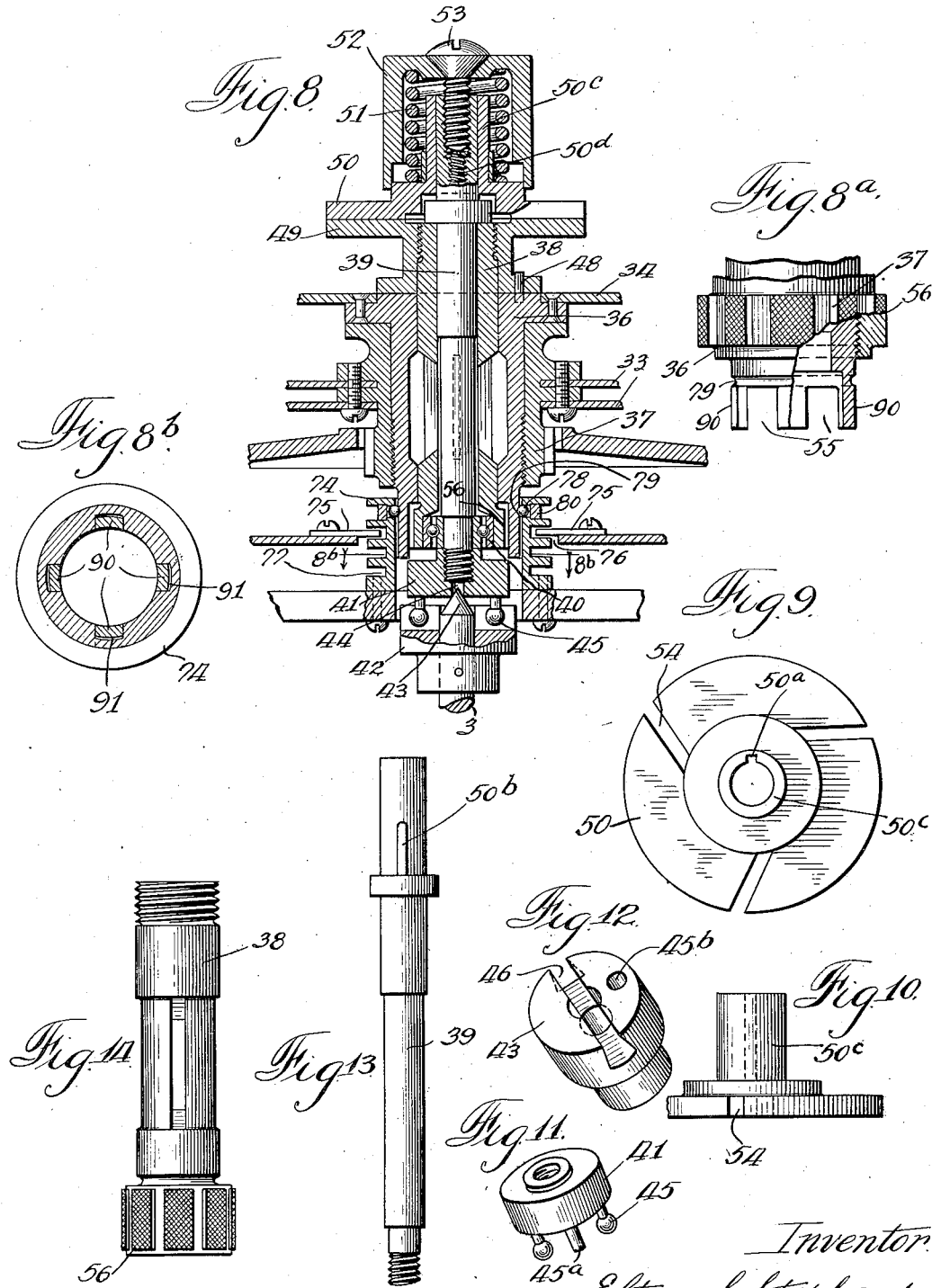
Inventor
Elton S. Stephens
By Jones, Addington, Ames & Seibold
Attys.

Patented June 2, 1936

2,043,127

UNITED STATES PATENT OFFICE 2,043,127

TESTING DEVICE FOR LIQUIDS

Elton S. Stephens, Chicago, Ill., assignor to Consistometer Corporation, Chicago, Ill., a corporation of Illinois Application April 7, 1931, Serial No. 528,285

3 Claims. (Cl. 265—11)

My invention relates to instruments for testing, indicating and recording the relative lubricating values and other properties of oils and other substances, and it has special reference to such instruments wherein various mechanical conditions and other conditions may be readily simulated that are essentially comparable to actual operating conditions to which the oil or other substance may be subjected in service. The empirical determinations made by the instrument of my invention upon the oil or other substance undergoing test are useful in evaluating the properties and appraising the value of the oil or other substance that has been subjected to test in my instrument.

This application is a continuation in part of my copending applications Serial Nos. 108,725 and 311,175. The former has matured into Patent 1,930,629, October 17, 1933.

The device of my instant invention provides an efficient and reliable means for determining the relative frictional qualities and other properties of lubricating oils and other substances through a considerable range of temperature and, for example, utilizes the varying friction of the oil under test as a means for transmitting motion from a constantly rotating element to a yieldingly controlled element, which latter is responsive to the varying frictional action of the lubricant being tested so that by a suitable mechanism a record will be automatically prepared by which the lubricating properties of the oil may be accurately evaluated at the varying temperatures within the range of the instrument.

The terminology of the specification and claims includes various words commonly used in the art and the following are the intended definitions thereof:

The word "shear" as used in this application is intended to mean the breaking of the adhesion on the disc surfaces or the cohesion between the surfaces without metallic friction. Shear appears in a liquid at any temperature.

By "channeling" is meant the absence of liquid resistance. Channeling does not appear in liquid but appears only at low temperatures in semi-colloids or semi-solids.

By "tenacious" is meant the relative power transmitted between the surfaces of two discs by a film of lubricant therebetween.

By "disrupted" or "ruptured" is meant the condition of the film at the end of lubrication and the beginning of metallic friction.

By "waste grabs" is meant the tendency of the threads of the waste to adhere to the journal at low temperatures and be carried thereby in between the bearing surfaces.

By "seizure" is meant when the metallic friction increases to the point of scuffing both or either of the bearing parts; that is, noticeable wear of the parts.

The device of my invention is provided with interchangeable elements or typical test pieces which provide means whereby the instrument may be used for a variety of tests including, among others, a hot tenacity test, a cold fluidity test, a cold shear test, a cold transmission test, a cold journal box test and a hot seizure test. While other tests may be performed with this device, a description of the above tests will indicate the various uses to which the machine of my present invention may be put. Tests of this type clearly demonstrate by an automatically recorded record or graph that oils which have some common properties, for instance, the same viscosity at 100° and at 210°, the same pour test, flash and fire points, etc., may, under identical operating conditions, prove to have highly different lubricating values as well as other properties that are wholly dissimilar. For instance, a hot tenacity test performed with my device may show that one oil breaks down or reaches its point of transition at 250° F. while another oil of an allegedly similar type may not reach its break down or transition point until over 270° F. For work at higher temperatures or higher pressures, or both, the latter oil may prove superior in practice. As the test progresses the instrument mechanically registers the relative coefficient of friction of the oil being tested. In the cold fluidity test my instrument records automatically the fluid resistance of the oil at all temperatures down to the end of the true fluidity or the temperature at which the oil ceases to flow freely. The test may also be continued to show the temperature at which channeling starts and, if desired, to show the temperature at which the oil is practically either completely channeled or turned into a plastic mass.

It has been estimated that more than half of the wear and tear on an automobile motor, with the consequent loss of power, is due to inadequate lubrication at the time the engine is started. It has also been shown that such inadequate lubrication is largely due to the use of an oil that possesses high resistance to shear. This invention makes it possible to accurately compare the shearing resistance of various oils. My invention may be used to obtain a continuous shear record of an oil during decrease in temperature.

It may also be used for intermittent start-and-stop test for any predetermined steps of temperatuer decrease. These tests are invaluable in figuring the battery power required to start an engine with any given oil at any given temperature. For instance, for easy starting in cold weather, the oil showing the lower shear and the lower end of true fluidity will prove superior in service. Therefore, generally speaking, it will be found in the use of these tests that the most serviceable oil for both summer and winter for automotive engine lubrication will be the oil which shows the highest point of transition and the lowest coefficient of friction, in combination with a low resistance to shear and a low end of true fluidity.

The device of my invention comprises a transmission attachment which duplicates the essentials of an automobile or other gear transmission and records the performance of lubricants for this purpose under varying temperatures. A journal attachment is also provided whereby a cold journal box test may be made and whereby accurate records may be obtained of the performance of various oils when used for railway car or other journal lubrication in conjunction with various kinds of waste.

It is also an object of my invention to provide a device which is small and compact which may be easily transported whereby it is possible to run a complete set of tests anywhere where a suitable electric current and a supply of $CO_2$ (carbon dioxide) ice are available.

My invention comprises a testing device including a plurality of interchangeable devices for making the various tests. The tests conducted on these interchangeable devices are typical of many of the operating conditions to which the oil may be subjected. For instance, the hot tenacity test is performed by two small and opposed discs one of which is fixed in a yieldingly mounted cup and the other of which is so mounted as to be rotated. The discs are submerged in the oil to be tested and a small but constant pressure is applied to one of the discs by a carefully calibrated spring. Means is provided for heating or cooling the oil as required.

When the discs are assembled a film of oil is interposed between their opposed testing surfaces. In fact, in assembling the discs for test, a film of oil is placed between their opposed testing surfaces before the discs are submerged in the body of oil undergoing test. This insures that the discs will not at the beginning of the test be in frictional engagement with each other. After the discs are assembled one of the discs is rotated and constitutes the driving member. The film of oil interposed between the testing surfaces of the two discs serves to transmit motion from the driving disc to the driven disc. This motion is transmitted because the interposed film of oil serves as a frictional drive between the two discs. The driven disc, which is yieldingly mounted, tends to rotate with the driving disc and the degree of its rotation is a measure of the frictional resistance exerted by the interposed film of oil. In other words, the degree of rotation of the driven disc is a measure of the lubricating value of the interposed oil film for the particular conditions that exist at the moment. The driven disc operates a stylus on a rotating chart and the record thus made on the chart is an indication of the lubricating values of the oil film interposed between the two discs during the period of test.

When the discs are employed for making the hot tenacity test they are completely submerged in the oil undergoing test but other testing devices, as mentioned above, are employed for testing the properties of the oil and in several instances these other testing devices are merely immersed in the oil and not submerged as the discs are.

When making certain tests upon the oil or substance the properties of which are being investigated, the film of oil between the opposed testing surfaces sometimes becomes disrupted. At this point of transition the oil ceases to be a lubricant. This point of transition is manifested on the chart through an outswing of the yieldingly mounted means which may be markedly indicated or registered by the recording device. The point at which this outswing occurs is designated as the point of transition of the oil.

The testing devices are preferably mounted in an inner bowl or cup which is supported in an outer cup the latter containing either a heating or cooling medium, depending upon the test to be made.

The cold tests are preferably made from 100° or room temperature down past the point of loss of true fluidity until any oil becomes channeled or becomes a stringy or plastic mass. The lubricant under test may be cooled by carbon dioxide snow (dry ice, etc.), packed in the space between the inner and outer bowls in place of the heating element and bath oil used on hot tests. The tests may be conveniently performed in almost any locality as electricity and $CO_2$ snow (dry ice, etc.) are now so generally available.

My invention provides a complete testing apparatus, particularly for oil and other lubricants, and the adaptability of the device to accommodate so many different kinds of tests to which lubricants should be submitted for the purpose of appraising their true relative lubricating value and for making and recording the results of such tests is an important feature of the present invention.

Other objects will be apparent from the specification and the appended claims.

In the drawings:

Fig. 2 is a perspective view of the complete device as assembled for use when making a cold test;

Fig. 3 is a front elevation partly in longitudinal axial section with the parts assembled in position for performing a hot test;

Fig. 4 is a vertical sectional view of the cup aligning means taken on a line corresponding to line 4—4 of Fig. 3;

Fig. 5 is a transverse sectional view taken on a line corresponding to line 5—5 of Fig. 3, with the upper bearing for the tachometer shaft removed to disclose the tachometer drive mechanism;

Fig. 6 is a front elevation of the tachometer driving gear and spindle shown in Fig. 5;

Fig. 7 is a top plan view of the stylus controlling and recording mechanism, the base being shown in horizontal section and the motor and operating mechanism being removed;

Fig. 8 is a vertical sectional view through the spindle mechanism and associated parts with the discs in position for performing a hot test;

Fig. 8a is a view partially in elevation and partially in section showing a portion of the spindle mechanism of Fig. 8;

Fig. 8b is a horizontal section taken along the line 8b—8b of Fig. 8 showing the connection between the outer bowl and its associated mechanism of Fig. 3 and the yieldingly mounted mechanism that operates the stylus of the recording mechanism;

Fig. 9 is a top plan view of the driven hot test disc;

Fig. 9A is a greatly exaggerated diagrammatic view illustrating the convexity of the disc surface;

Fig. 10 is a side elevation of the driven disc shown in Fig. 9;

Fig. 11 is a perspective view of the driven coupling member shown in section in Fig. 8;

Fig. 12 is a perspective view of the driving coupling member shown in section in Fig. 8;

Fig. 13 is a side view of the driven spindle shaft shown in Fig. 8; and

Fig. 14 is a side elevation of the inner shaft bearing sleeve shown in Fig. 8.

Figure 1:
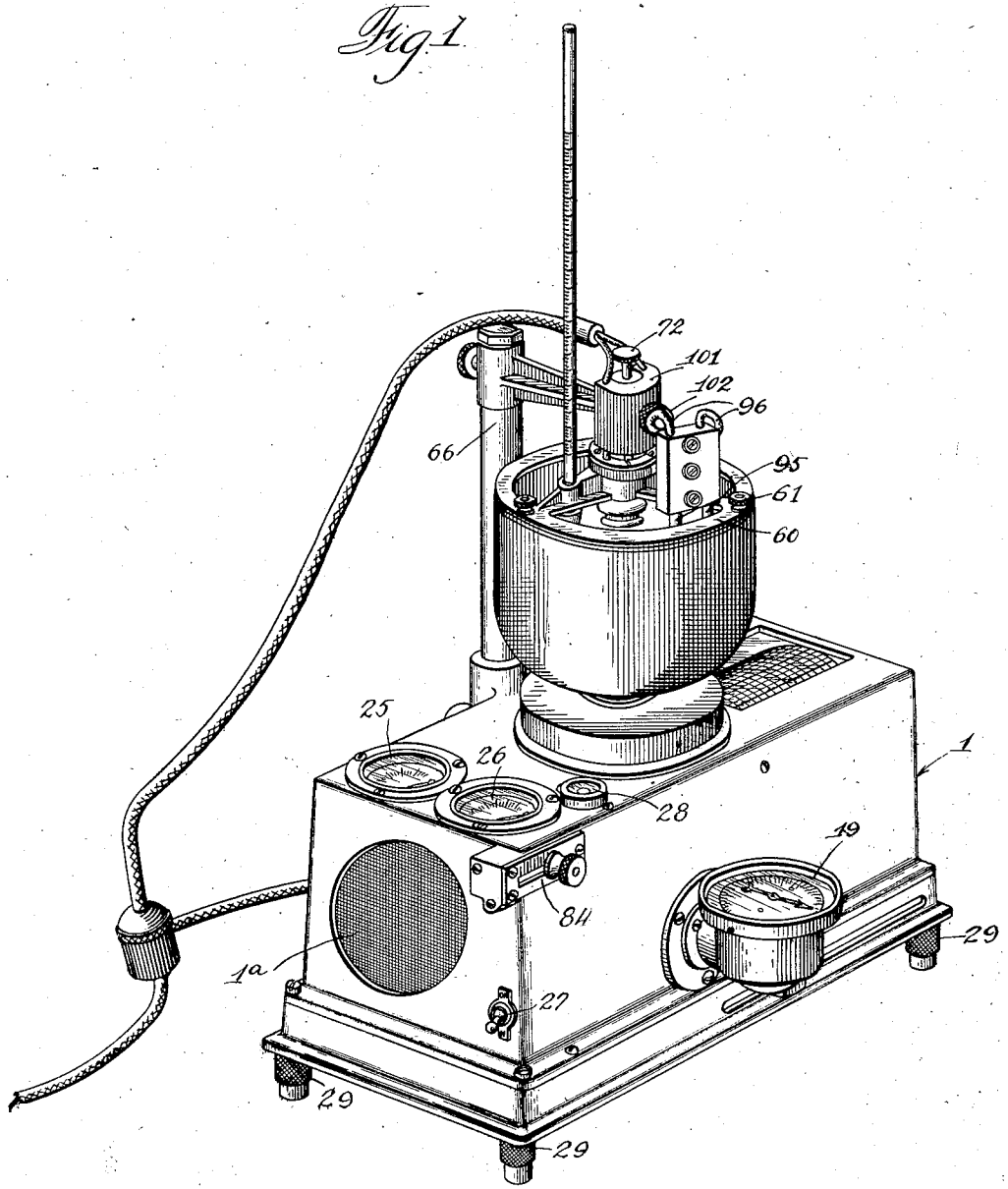
Figure 1 is a perspective view of one embodiment of my invention with the heater in position for performing the hot tenacity test.

Referring to the drawings, the embodiment illustrated comprises a box-like base 1 in which is mounted a motor 2 (Fig. 3) and a transmission and driving mechanism for driving and synchronizing suitable testing and recording devices. The transmission includes a vertical shaft 3 supported in bearings in a bracket 4, the shaft 3 being driven from the motor 2 through a worm 5 on the motor shaft, and a worm gear 6 on the shaft 3. This shaft 3 is arranged to drive a testing mechanism which will be described later.

A horizontally disposed stub shaft 7 is rigidly supported on the bracket 4 and is arranged to receive a removable recording cylinder 8. The cylinder 8 is arranged to be rotated on the stub shaft 7 and is provided with a hub 9 having a conical friction clutch portion 10 arranged to removably engage a cooperating clutch member 11 secured to a gear 12 which latter is rotatably mounted on the shaft 7. The gear 12 is driven from the shaft 3 through a suitable speed reducing mechanism comprising a pinion 13, gear 14, pinion 15 and gear 16 meshing with a suitable worm 17 on the shaft 3. The pinion 13 and gear 14 are rigidly connected and the pinions 15 and 16 are secured to a suitable stub shaft 18, all of the speed reducing mechanism being mounted on the bracket 4. The cylinder 8 is thereby arranged to be rotated at a very slow speed and suitable graph paper may be applied to the surface of the cylinder on which may be automatically recorded a permanent record of tests and the cylinder may be easily removed or inserted at any time.

It is necessary that all of the mechanism should be driven accurately at a predetermined uniform speed and for this purpose a tachometer or speed indicator 19 is removably supported in the base 1 and arranged to be driven through the motor driven worm 5 and a suitable worm pinion 20 secured to a transverse shaft 21. The end of the shaft 21 is provided with a rectangular opening 22 (Fig. 6) to receive the end of the tachometer shaft 23 which is of a contour suitable for engagement therein and which provides a suitable driving means therefor. The shaft 21 is supported in bearings 24 (Fig. 3) on the transmission housing which latter forms a part of the bracket 4.

A volt meter 25 and an ammeter 26 are also mounted in the base to provide an accurate means for motor control and a screen covered opening 1a provides ventilation for the motor. A switch 27 is also inserted in the motor circuit. It is desirable that the device should be accurately aligned during all testing operations and for this purpose a suitable spirit level 28 is mounted on the base 1 and adjustable legs 29 are secured to the base and may be adjusted until the device is accurately aligned. A rheostat 30 is mounted in the base of the machine and connected in the motor circuit. A rheostat handle 31 extends through a slot 32 in the base and the rheostat may be adjusted thereby to control accurately the motor speed.

A testing mechanism is vertically mounted with relation to the base 1 and comprises an outer cup 33 and an inner cup 34. The outer cup is considerably larger than the inner one and is arranged to receive either a cooling or heating medium depending upon the test to be made. The outer cup is provided with a heat insulating wall having a closed space 35 therein. The inner cup 34 is rigidly secured to a sleeve 36 and the outer cup is rigidly secured to a bushing 37 which latter is snugly threaded on the inner cup supporting sleeve 36 and arranged to oscillate therewith, the inner sleeve 36 thereby supporting both the inner and outer cups. The inner sleeve 36 and the cup assembly are removably mounted on a bearing sleeve 38 shown in detail in Fig. 14.

A shaft 39 is rotatably mounted in the bearing sleeve 38 by means of a suitable ball bearing 40. A driven coupling member 41 is secured to the threaded lower end of the shaft 39 and is driven from the shaft 3 by means of a driving coupling member 42 secured thereto. The lower end of the shaft 39 is held in alignment with the shaft 3 by means of a tapered end 43 of the shaft 3 centering in a centrally located opening 44 in the driven coupling member 41. The driving is accomplished by means of ball headed pins 45 (Figs. 8 and 11) on the driven head 41 and which are removably engaged in a dovetail slot 46 (Fig. 12) in the face of the driving member 42, and a locating pin 45a attached to the member 41 is arranged to enter an opening 45b in the driving member 43 to assist in always locating the driving and driven members in the same relation to each other, as shown in Fig. 8. This arrangement of ball pins and dovetail slot is for the purpose of preventing the tendency of the shaft 39 to rise out of driving engagement when driven at a high speed. This is prevented by the enlarged portions of the pins 45 engaging the tapered portions of the slot 46.

The upper end of the sleeve 36 is substantially flush with the inner surface of the bottom of the inner cup 34 and is provided with an upwardly extending pin 48 (Fig. 8), and the various testing devices which are interchangeable and arranged to be inserted in the inner cup are provided with openings for the purpose of engaging this locating pin when they are assembled. The interchangeable devices used for accomplishing a hot fluidity test are shown in assembled relation in Figs. 3 and 8 and include a lower disc 49 which is secured to the bearing sleeve 38 by being threaded thereon as shown. This lower disc is provided with a downwardly extending flange having a locating hole therein to receive the pin 48. An upper disc 50 (Fig. 9) is slidably mounted on the shaft 39 by means of a key slot 50a in which is engaged a key 50b on the shaft 39 (Fig. 13) and the disc 50 is yieldably held in operative relation with the shaft 49 by means of a coiled spring 51 interposed between an integrally formed sleeve 50c and an inverted cup-shaped bushing 52 which latter is secured in position by means of a screw 53. The screw seats against a steel hardened pin 50d that is adjustably threaded in the bottom of a threaded hole in the shaft 39 thereby retaining the disc 50 in yielding engagement with the disc 49. The spring 51 which is carefully calibrated, in combination with the adjustable stop pin 50d, ensures that the screw 53 when in position will effect a constant and predetermined pressure to be exerted by the disc 50 upon the disc 49. The disc 50 is provided with angularly disposed slots 54 (Fig. 9) to allow the lubricant to be tested and in which the discs are submerged to reach the testing surfaces of the discs and to form a continually replenished film therebetween. These angularly disposed slots are extremely desirable and perform the important function of evenly distributing the lubricant at all temperatures, over the entire surface of the discs. The slots also provide means whereby any particles of grit or foreign matter in the lubricant will be forced outwardly by centrifugal action as well as by the propeller action of the slots. The discs are preferably provided with very slightly convex surfaces which become perfectly flat with a rise in temperature and which then provide flat, parallel cooperating testing surfaces.

It will be noted that the sleeve assembly as described forms a sub-assembly including the cups 33 and 34 and which assembly may be easily inserted or removed from engagement with the driving mechanism, and the testing disc members just described may also be easily removed and replaced by other interchangeable devices which are essential to accommodate all necessary kinds of tests to which lubricants may be submitted for the purpose of appraising their relative lubricating value. The lower end of the bushing 36 is provided with slots 55 (Fig. 8a) through which a knurled portion 56 of the bushing 38 may be engaged in order that the bushing 38 (Figs. 8 and 14) may be screwed into the disc 49 or other of the interchangeable testing devices to be later described.

The inner cup 34 is provided with a cover 57 having an adjusting screw 58 therein which is arranged in axial alignment with the hardened bushing 59 (Fig. 4) in a spider 60, which latter rests upon the top of the outer cup 33 and is secured thereto by means of thumb nuts 61. The inner cup cover 57 and the spider 60 are provided with aligned openings 62 and 63, respectively, through which a thermometer 64 extends and which is supported in a cork bushing 65 in the opening 62. The thermometer extends to a point adjacent the testing discs and the cover 57 may be provided with any suitable locating means whereby it will always retain the thermometer openings in alignment.

In order to hold the entire assembled testing units in vertical alignment, a vertical post 66 (Figs. 1 and 2) is supported on the base at the back of the machine and parallel with the vertical shaft 3. An adjustable aligning device is slidably mounted on this post and comprises a bracket 67 secured thereto by a thumb screw 68. The bracket extends over the testing device and includes a centering means for engagement with the spider 60. This centering means comprises a spring pressed plunger 69 (Fig. 4) having a downwardly extending bearing portion 70 arranged to engage the inner ball race of a ball bearing 71 supported in the spider 60. A handle 72 is provided on the plunger for disengaging the device and a shoulder 73 engages the plunger to prevent downward frictional engagement and to allow free oscillation of the cups.

A grooved bushing 74 (Figs. 8 and 8b) is normally supported on the arcuate members 75 which are removably secured adjacent an axial opening 76 in the base 1 and extend into one of the grooves 77 in the bushing. This bushing is provided with a plurality of balls 78 projecting into the bore of the bushing and retained in a position to engage in a groove 79 in the sleeve 36. When the end of the sleeve is inserted in the bushing, as shown in Fig. 8, the balls 78 are retained in position by means of a spring split ring 80. The balls act as a vertical locating means for the bushing 36 and when the balls are engaged in the groove 79 the bushing is so positioned that the arcuate members 75 are not in engagement therewith but are substantially centrally located in one of the grooves 77.

The bushing 74 extends into the casing 1 and is provided with outwardly extending arms 81 (Fig. 7). Springs 82 are secured to these arms and to adjustable tensioning thumb screws 83 which are adjustably mounted on opposite corners of the base as shown in Figs. 1, 2 and 7. Graduated scales 84 are associated with the adjusting means so that the tension of the springs may be accurately adjusted for any desired tests. The arms 81 normally rest against stops 85 so that the bushing and associated arms 81 may oscillate to a degree relative to the friction between the testing devices used and the tension of the springs 82. A stylus 86 is mounted for longitudinal movement on a rod 87 (Fig. 7) and is arranged to engage the surface of the graph paper secured to the cylinder 8. This stylus may be raised from the surface of the paper when desired by raising a rod 88 which is pivoted on the frame 1 and extends underneath the stylus and which may be raised when desired by means of a handle 89.

In order that the bushing 74 may be rotated to a degree corresponding to the drag occasioned by the oil or other substance undergoing test between the driven member and the driving member—for example, the drag or frictional resistance ocasioned by the oil film interposed between the testing surfaces of the discs 49 and 50 of Fig. 1—the downwardly extending portions 90 of the cup supporting bushing 36 are engaged in longitudinal grooves 91 in the bushing 74 (as shown in Fig. 8b) and provide a slip coupling between the sleeve 36 and the bushing 74. When the upper disc 50 is rotated it is obvious that the cup assembly will rotate to a degree proportionate to the drag between the testing surfaces of the testing devices 49 and 50 and the sleeve 36 and bushing 74 will rotate therewith against the tension of the springs 82. During this rotation the flat connecting links 92 between the springs and the arms 81 will engage the arcuate surfaces 93 of the arms 81.

Figs. 1 and 3 illustrate the device assembled for a hot tenacity test and when used for this purpose a heating element is inserted adjacent the bottom of the outer cup and comprises a ring-like heating member 94 having an upwardly extending conductor supporting member 95 with flexible leads 96 therefrom electrically connected with commutator-like segments 97 on an insulating ring 98 which latter is supported on a hub 99 of the spider 60. Current is supplied to this commutator by means of contacts 100 which are carried by an insulating block 101 removably secured to the aligning bracket 67 by means of a thumb screw 102, the contacts being connected with suitable supply conductors 103.

It is desirable to hold the number of spindle revolutions per minute within a narrow range and approximately the same during all comparative tests. However, before making a test, the instrument is run idle for a short time preceding a test to allow the motor to attain its thermal equilibrium before the test is started.

The construction described is especially arranged to prevent any factors, except those directly concerned with the test, from influencing the result of the test and the device is usually provided with an inner test bowl and spindle assembly for hot tenacity tests and another inner bowl and spindle assembly for cold fluidity and shear tests. This is to avoid subjecting the same shaft spindle and inner bowl to the extreme variation of temperature required in the various tests and also to make it easy and practical to run hot and cold tests immediately after each other without danger to the equipment.

In making the hot tenacity test with the mechanism assembled as shown in Figs. 3 and 8, a few drops of the lubricant or material to be tested is poured or smeared on the top surface of the lower disc 49. This is to insure that the disc never operates in a dry condition. The top disc 50 is then secured in position and sufficient lubricant is poured into the inner bowl to immerse the discs; approximately 200 c. c. is required and the oil must be free from any impurities. The outer bowl is then filled with a heating bath preferably of heavy oil reaching to a point adjacent the top of the inner bowl. The electric heater is connected in circuit. The instrument is then run for a short time in order to make sure that a continuous film of the oil to be tested flows between the testing surfaces of the discs before the test is actually started. Then as soon as the thermometer 64 registers a desired temperature the actual test is started. For instance, if a test is started as soon as the thermometer 64 registers over 99° F. the comparative torque of the oil film at 100° F. may be registered directly on the chart. The starting torque will be the maximum swing-out registered by the stylus. The running torque will be that registered by the stylus within approximately one-half minute after the test is started and the test charts may be plotted to produce a true picture of the coefficient of friction of the oil tested up to the point of transition. As the temperature increases, the oil being tested will exert less and less torque and the stylus will therefore inscribe a curve towards a deadline or zero line on the chart. As the stylus approaches closer and closer to the zero line on the chart the frictional resistance between the two discs will be correspondingly lessened, thus approaching nearer and nearer to perfect lubrication, i. e., less and less friction between the testing surfaces of the discs. When the film of oil between the testing surfaces breaks down, whereupon the testing surfaces are brought into physical engagement with each other, however slight, then the "point of transition" of the oil is reached. After the oil has reached the point of transition, friction gradually increases, the bowl and stylus begin to oscillate, and the stylus tends to draw away from the deadline again. Therefore, the point of transition of the oil tested is indicated as having occurred at that point in the graph which is at the top of the arc and at the temperature registered at the time the stylus is nearest the deadline or line of no torque on the chart, or whenever the line begins to increase noticeably in width due to oscillation of the cup.

The embodiment illustrated may be varied in detail without departing from the spirit of the invention and I desire to be limited only by the prior art and the appended claims. Having thus described my invention, what I claim and desire to secure by Letters Patent is:

1. A comparatively thin lubricant testing disc of the character described having a testing face distorted a predetermined amount at room temperature, and made of a material so that the face will tend to become planar at a desired operating temperature.

2. A lubricant testing disc of the character described comprising a hub having an axial opening and a comparatively thin flange thereon, said flange having a testing face normally distorted a predetermined amount at room temperature and made of material so that the disc face will tend to become planar at a desired operating temperature, said flange having slots therein for distributing the lubricant to said surface, said slots being angularly disposed relative to radial lines through said discs.

3. A lubricant testing device of the character described comprising a yieldable movable container for lubricant to be tested, means for resisting the movement of said container, a pair of testing discs in said container and having cooperating testing surfaces distorted a predetermined amount at room temperature and made of material so that the surfaces will tend to become planar at the desired operating temperature, one of said discs being operatively connected with said container, means for driving the other disc, means for varying the temperature, and means operatively connected with said container for automatically indicating the friction between the discs at various temperatures.

ELTON S. STEPHENS.